United States Patent Office 3,252,858
Patented May 24, 1966

3,252,858
INSECT REPELLENTS AND METHOD OF USING
Lyle D. Goodhue, Bartlesville, Okla., assignor to Phillips Petroleum Company, a corporation of Delaware
No Drawing. Filed Aug. 9, 1963, Ser. No. 301,187
5 Claims. (Cl. 167—46)

This invention relates to repelling insects, particularly fruit flies. In one aspect this invention relates to compounds which repel fruit flies. In another aspect this invention relates to method and composition for repelling fruit flies.

Various types of insects are a hazard and very damaging to the agriculture industry, particularly the common fruit fly (Drosophila) which causes large damage and economic loss to the fruit growing industry. The control of such insects is a major problem to the industry today. The constant warfare being waged against such insects has developed into large research programs to find insecticides and repellents for use in combatting insects. The common fruit flies lay their eggs in ripe fruit, and when the eggs hatch the larvae causes considerable damage to the fruit. Therefore, there is a constant demand for improved repellents for fruit flies. It is common practice to apply the repellent directly to the fruit to protect it from the damage caused by fruit flies.

Accordingly, it is an object of this invention to provide new compositions which repel fruit flies. It is another object of this invention to provide an improved method for repelling fruit flies.

Other objects will be apparent to one skilled in the art upon further reading the disclosure of this invention and appended claims.

I have discovered that certain pyridine and quinoline compounds of the formulas:

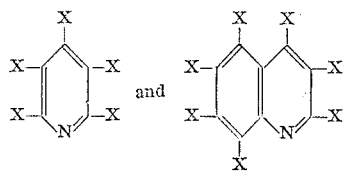

wherein each X is selected from the group consisting of hydrogen, 1–4 carbon alkyl radicals, nitro, chloro, bromo, amino, hydroxy and 1–4 carbon alkoxy radicals and wherein at least one X is nitro, and at least one other X is selected from the group consisting of chloro and bromo is effective to repel fruit flies.

Further in accordance with this invention a compound, as noted above, is applied to a locus to repel fruit flies therefrom.

Examples of suitable pyridine and quinoline compounds as described by the above formulas which can be employed as insect repellents according to the process of this invention are:

2-chloro-5-nitropyridine
2-chloro-3-nitropyridine
2-chloro-3,4-dinitropyridine
2-bromo-5-nitro-4,6-dimethylpyridine
3-bromo-5-nitropyridine
3-chloro-5-nitro-2,4,6-trimethylpyridine
2-chloro-3-amino-5-nitropyridine
2-chloro-4-isopropyl-5-nitropyridine
2-bromo-5-nitro-3,4,6-tri-n-butylpyridine
2-chloro-3,4,5-trimethyl-6-nitropyridine
2-chloro-3-methyl-4-ethoxy-5-nitropyridine
3-bromo-4-hydroxy-5-nitropyridine
2-bromo-4-nitroquinoline
2-chloro-5-nitroquinoline
3-bromo-4,6,7,8-tetra-n-butyl-5-nitroquinoline
2-chloro-3,8-diethoxy-6-nitroquinoline
2-bromo-4,5,6,7,8-pentamethyl-3-nitroquinoline
2-bromo-8-amino-5-nitroquinoline
2-chloro-4,7-dibutoxy-3-nitroquinoline
and the like.

The fruit fly repellent compounds of this invention can be applied to any surface or locus where fruits may be growing or stored, such as orchards, transporting cases, display and storage bins. Preferably the repellent compounds are applied directly to fruits subject to oviposition or egg laying by fruit flies. The repellent compounds are applied by conventional carriers which are inert to the repellent, such as solutions, emulsions, dusts, wettable powders, aerosols, and the like. Solid inert carrier material such as talc, kieselguhr, and the like are employed when preparing powders. Solvents which can be employed include such materials as naphtha, kersosene, toluene, cyclohexanone, acetone and the like. Generally, the solvent employed will boil above atmospheric temperature. One particularly effective solvent which can be used is an isoparaffinic hydrocarbon boiling in the approximate range of 260–800° F. which is sold under the trademark of "Soltrol" and which is usually produced by the HF alkylation of an isoparaffin with an olefin.

The amount of the repellent compound used in solutions, emulsions, etc. can vary over a wide range, but will generally be within the range of from 0.05 to 20 percent by weight. In some instances, even lower concentrations can be used, while the upper limit is dictated primarily by economics.

When applying the fruit fly repellent compounds of this invention to a locus from which it is desired to repel fruit flies and thereby prevent egg laying on or in the fruit, the method of application will be chosen so as to deposit from 0.01 to 20 grams per 100 sq. ft. of area.

The following specific examples are presented to illustrate the effectiveness of the invention as fruit fly repellents and such is not intended to limit the invention to the specific compounds and concentrations and insect shown.

*Example I*

An olfactometer was employed to evaluate the response of the common fruit fly (Drosophila) to the vapor phase of the compounds of this invention. The test apparatus consisted of two glass cylinders, the inside surface of which were sand blasted. A fine wire screen of the same size as the I.D. of the cylinder was placed 5 inches from the base. In each glass cylinder a piece of cardboard was placed below the screen which acted as a partition in separating the air flows from the flared glass tubes. The larger end of each tube was covered with a large piece of facial tissue, one treated with only acetone and the other treated with a solution of acetone and 2-chloro-5-nitropyridine. Approximately 0.04 ml. of acetone or acetone solution was applied to the facial tissue in each case. Fruit flies, adult males and females, were placed in pint cartons approximately 1 hour before being used in the test. The olfactometer apparatus was assembled with fruit flies in each cylinder which were held within ¼ to ⅜ inch of the screen by another similar screen. The top screen like the lower screen was cut to fit snugly so it would stay in place when pushed down from the top. A water vacuum pump was employed as the driving force for the air stream, and the uniformity of air flow in each cylinder was balanced by a flow meter. Fruit flies were able to select between a gentle air stream containing vaporized 2-chloro-5-nitropyridine or an uncontaminated air stream.

The 2-chloro-5-nitropyridine tested by this procedure proved to be 100 percent repellent when a acetone solution containing 1 percent by weight of this compound was applied to the facial tissue on one side of the olfactometer apparatus. No flies were found to the treated air stream side of the apparatus. The repellency of this compound to fruit flies was so outstanding the test apparatus had to be completely cleared of the vapors of this material before being used again.

*Example II*

In another test, agar media was dipped in a 2 percent solution of 2-chloro-5-nitropyridine in water and then placed in a Petri dish. This Petri dish was then placed (approximately 1 hour after dipping) in a 1-pint ice cream carton containing 50 pairs of male and female fruit flies. At the end of 1 day, the number of eggs deposited in the media were counted. The agar media was replicated 5 times and the test continued each time. Only one egg (total) was found in the treated media during the five tests, and this was believed to have been dropped rather than ovipositioned. In a similar series of 5 tests using untreated agar media, a total of 161 eggs were found in the media.

From the above examples it will be readily apparent to one skilled in the art of the usefulness and advantages of the compounds of this invention as insect repellents, particularly fruit flies, when subjected to the effect of a repellent amount of the compounds of this invention.

Reasonable variations and modifications of this invention will be apparent to one skilled in the art in view of the foregoing disclosure without departing from the spirit and scope of the invention.

That which is claimed is:

1. A method of repelling fruit fles which comprises applying to a locus normally frequented by fruit flies a repellent amount of at least one compound having a structural formula selected from the group consisting of

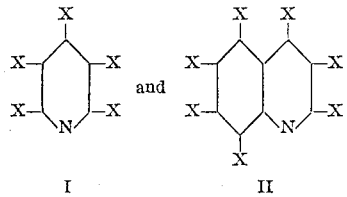

wherein each X is selected from the group consisting of hydrogen, 1–4 carbon alkyl radicals, nitro, chloro, bromo, amino, hydroxy and 1–4 carbon alkoxy radicals and wherein at least one X is nitro, and one other X is selected from the group consisting of chloro and bromo.

2. The method of claim 1 wherein said compound is 2-chloro-5-nitropyridine.

3. A method of repelling fruit flies which comprises applying to fruit subject to oviposition or egg laying by fruit flies a composition containing 0.05 to 20 weight percent of a pyridine or quinoline compound having a formula as defined in claim 1 and the remainder a carrier selected from the group consisting of solid inert materials and solvents selected from the group consisting of naphtha, kerosene, toluene, cyclohexanone, acetone and a paraffinic hydrocarbon boiling between 260–800° F.

4. A method according to claim 3 wherein the amount of said composition applied to said fruit amounts to 0.01 to 20 grams per 100 square feet of fruit to be protected.

5. A method according to claim 3 wherein said compound is selected from 2-chloro-5-nitropyridine and 2-chloro-5-nitroquinoline.

References Cited by the Examiner

UNITED STATES PATENTS 3,044,930   7/1962   Goodhue et al. _____ 167—46
3,113,072   12/1963   Goodhue et al. _____ 167—46

OTHER REFERENCES

Chemical Abstracts, vol. 47, entry 6403 i, 1953 (citing Takabashi et al., J. Pharm. Soc., Japan, vol. 72, pp. 381–384, 1952).

Chemical Abstracts, vol. 50, entry 11340 c, 1956 (citing Chierici et al., Ricerca sci., vol. 25, pp. 2316–2322, 1955).

Chemical Abstracts, vol. 58, entry 3394e, 1963, (citing Buchmann et al., J. Pract. Chem. 16, 207–19, 1962).

Chemical Abstracts, vol. 58, entry 6791a–g, 1963, (citing Tucker et al., J. Chem. Eng. Data 8, 132–3, 1963); Crawford et al., J. Chem. Eng. Data, 8, 120–2 (1963); Beasley et al., J. Chem. Eng. Data, 8, 133–4 (1963); and Altau et al., J. Chem. Eng. Data, 8, 130–1 (1963).

Chemical Abstracts, vol. 59, entry 11210a, 1963, (citing Illuminati et al., Chem. Ind. (London) 1963 (31), 1287.

Surrey et al.: Journal of the American Chemical Society, vol. 73, pp. 2413–2416, June 1951.

LEWIS GOTTS, *Primary Examiner.*

JULIAN S. LEVITT, *Examiner.*

RICHARD L. HUFF, *Assistant Examiner.*